United States Patent [19]

Tada

[11] Patent Number: 4,812,915
[45] Date of Patent: Mar. 14, 1989

[54] IMAGE READING APPARATUS WHICH ELIMINATES MOIRE PATTERNS BY MAGNIFYING AN IMAGE OPTICALLY AND REDUCING IT ELECTRICALLY

[75] Inventor: Kaoru Tada, Aichi, Japan

[73] Assignee: Minolta Camera Kabushiki Kaisha, Osaka, Japan

[21] Appl. No.: 31,430

[22] Filed: Mar. 27, 1987

[30] Foreign Application Priority Data

Mar. 28, 1986 [JP] Japan .................................. 61-72210

[51] Int. Cl.$^4$ ........................ H04N 1/393; H04N 1/04
[52] U.S. Cl. .................................. 358/287; 358/285; 358/293
[58] Field of Search ............... 358/285, 287, 289, 290, 358/291, 292, 293, 294

[56] References Cited

U.S. PATENT DOCUMENTS

| | | | |
|---|---|---|---|
| 4,390,235 | 6/1983 | Minoura | 350/6.1 |
| 4,673,972 | 6/1987 | Yokomizo | 358/287 |
| 4,675,727 | 6/1987 | Sekizawa et al. | 358/75 |
| 4,682,243 | 7/1987 | Hatayama | 358/287 |
| 4,724,330 | 2/1988 | Tuhro | 358/293 |
| 4,740,844 | 4/1988 | Yoshimura | 358/287 |
| 4,751,376 | 6/1988 | Sugiura et al. | 358/293 |
| 4,771,473 | 9/1988 | Sugiura | 358/287 |

FOREIGN PATENT DOCUMENTS

| | | | |
|---|---|---|---|
| 57-11570 | 1/1982 | Japan | 358/287 |
| 57-65959 | 4/1982 | Japan | 358/289 |
| 57-91071 | 6/1982 | Japan | 358/287 |
| 59-101959 | 6/1984 | Japan | 358/287 |
| 59-123367 | 7/1984 | Japan | 358/293 |
| 59-176978 | 10/1984 | Japan | . |
| 60-204170 | 10/1985 | Japan | . |
| 61-6978 | 1/1986 | Japan | 358/287 |

Primary Examiner—James J. Groody
Assistant Examiner—Randall S. Svihla
Attorney, Agent, or Firm—Price, Gess & Ubell

[57] ABSTRACT

Disclosed is an image reading apparatus wherein an image of a document is projected on an image sensor at an enlarged magnification of N times the normal magnification. This causes an electrical reduction circuit to reduce its input data by 1/N times the input. The data for determining the magnification N is stored in a memory from which the data corresponding to one of a plurality of levels selected by the operator is read out. The moire pattern due to a difference in phase between the dot pitch and the reading pitch is elminated by the optical enlargement. On the other hand, the moire pattern due to the periodic characteristics of dither processing is removed by the optical enlargement which eliminates a low-frequency component of the read data and by the electrical reduction which slightly alters the phase of read data.

10 Claims, 3 Drawing Sheets

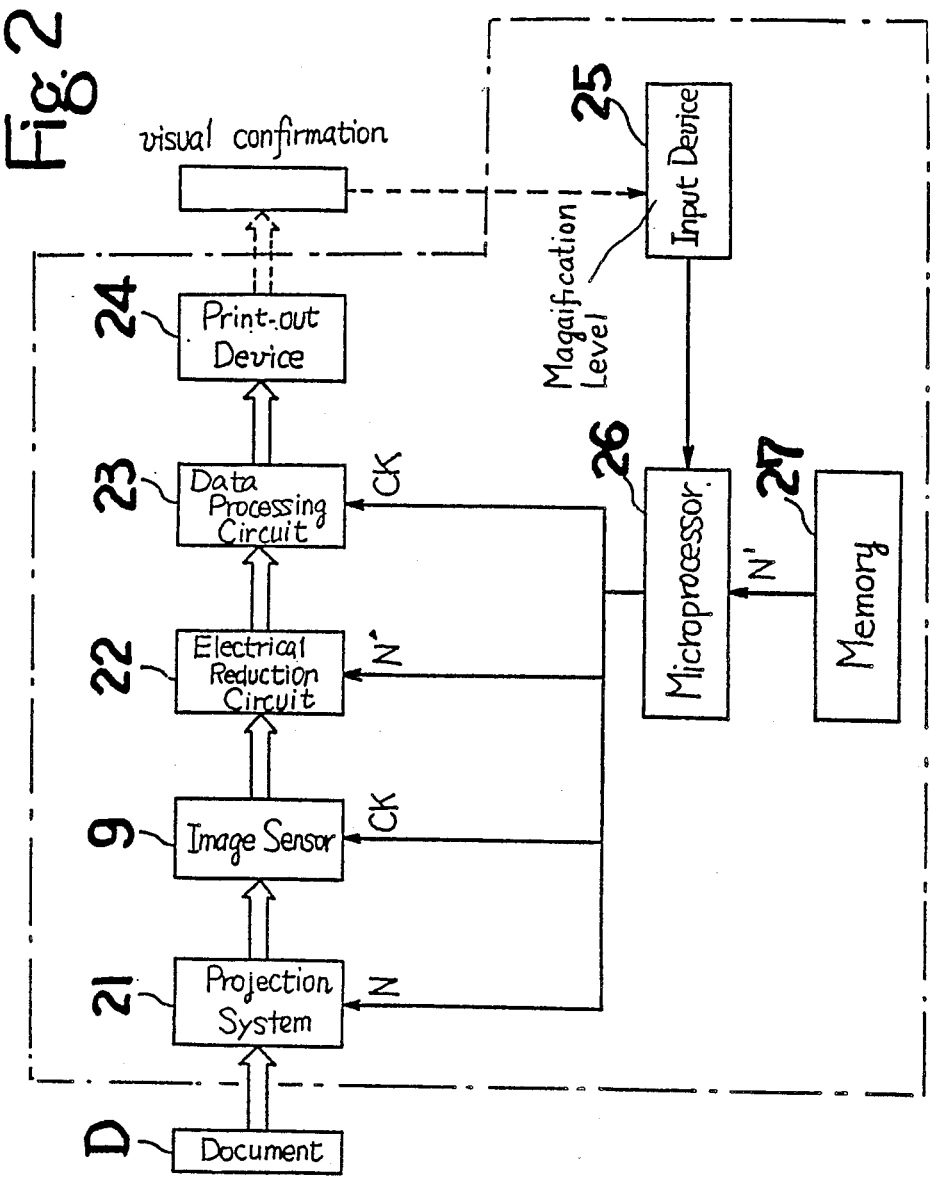

IMAGE READING APPARATUS WHICH ELIMINATES MOIRE PATTERNS BY MAGNIFYING AN IMAGE OPTICALLY AND REDUCING IT ELECTRICALLY

FIELD OF THE INVENTION

The present invention relates to an image reading apparatus, and more particularly to an image reading apparatus capable of eliminating a moire pattern.

BACKGROUND OF THE INVENTION

Image reading apparatus are so adapted that the density of an original as divided into minute areas is read by an image sensor from area to area and then subjected to data processing including tone reproduction to obtain digital data of an image of the original, which is sent to an output device such as a printer.

In reading halftone images with the image reading apparatus, a periodic density pattern, i.e. a so-called moire pattern, is likely to occur when the relation between the dot pitch, the reading density and further the periodic characteristics of tone reproduction involves a delicate phase difference. The moire pattern renders printed-out images less legible.

As an attempt to eliminate the moire pattern, it has been proposed to practice the dither process, as one mode of tone reproduction, using a dither matrix of an altered size or pattern. However, this proposal is infeasible if the occurrence of the moire pattern is attributable to the reading density pitch.

SUMMARY OF THE INVENTION

Accordingly, the main object of the present invention is to provide an image reading apparatus capable of eliminating moire patterns.

Another object of the invention is to provide an image reading apparatus capable of eliminating moire patterns by the combination of optical enlargement and electrical reduction.

These and other objects of the invention are fulfilled by an image reading apparatus wherein an image of the original is projected on an image sensor at an enlarged magnification of N times the usual magnification, and the output data from the image sensor is electrically reduced to 1/N.

BRIEF DESCRIPTION OF THE DRAWINGS

These and other objects or features of the present invention will become apparent from the following description of a preferred embodiment thereof in conjunction with the accompanying drawings, in which:

FIG. 2 is a diagram for illustrating how a moire is eliminated by the image reading apparatus;

DETAILED DESCRIPTION OF THE INVENTION

Figure 1:
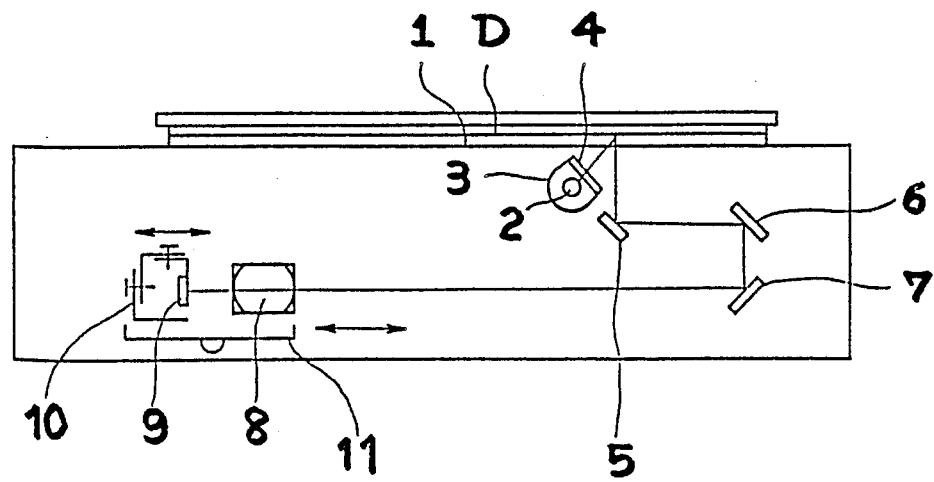
FIG. 1 is a schematic view in section showing the mechanical construction of an image reading apparatus embodying the invention.

FIG. 1 is a sectional view schematically showing an image reading apparatus embodying the present invention. With reference to this drawing, a document D is placed on a document glass plate 1. First and second scanning systems are disposed under the glass plate 1. The first scanning system comprises a lamp 2, a reflecting mirror 3 for directing the light from the lamp 2 toward the document D, an infrared cutting filter 4 and a first mirror 5 which are movable together along the glass plate 1 at a velocity dependent on the magnification of projection. The second scanning system comprises second and third mirrors 6 and 7 and moves at one-half the velocity of the first scanning system.

An image of indicia on the document scanned by the first and second scanning system is projected onto an image sensor 9 by a projection lens 8. The image sensor 9 comprises a unidimensional array of CCD's (charge-coupled devices) arranged perpendicular to the plane of the drawing. The image sensor 9 is held on a holding plate 10 at a variable distance from the projection lens 8. The holding plate 10 and the projection lens 8 are mounted on a carriage 11. The holding plate 10 and the carriage 11 are correlatedly moved by an unillustrated drive mechanism, whereby the projection lens 8 and the image sensor 9 are set in a specified magnification position in a focused state. The projection lens 8 and the image sensor 9 may be made movable by the mechanism disclosed in U.S. patent application Ser. No. 850,934 filed on Apr. 11, 1986 now U.S. Pat. No. 4,751,736, by the present assignee.

As will be apparent from FIG. 1, the image of the indicia on the document is projected on the image sensor 9 on a reduced scale. This reduction magnification of projection is a magnification set for usual documents which will not permit occurrence of any moire pattern and is to be hereinafter referred to as a "normal magnification." It is to be noted that the optical enlargement resorted to in the present invention refers to a value greater than the normal magnification.

FIG. 2 is a block diagram for illustrating how to eliminate the moire pattern according to the invention. The portion surrounded by a dot-and-dash line corresponds to the image reading apparatus of FIG. 1.

Referring to FIG. 2, the image of the indicia on the document D is projected onto the image sensor 9 by the projection system described with reference to FIG. 1 and designated at 21. The electric signal produced from the image sensor 9 is converted by an unillustrated A/D converter to digital data, which is then sent to an electrical reduction circuit 22 which will be described later. The data from the electrical reduction circuit 22 is thereafter sent to a data processing circuit 23, in which it is subjected to binary processing. The binary processing includes simple binary processing for character documents and dither processing for halftone documents. One of these processing modes is suitably selectable. The binary processing can be executed also by the arrangement disclosed in the foregoing application Ser. No. 850,934.

The image reading apparatus is connected to a print-out device 24, such as a laser printer. The data from the data processing circuit 23 is converted by the print-out device 24 to a visible image on paper. The operator visually checks the paper delivered from the device 24. If a moire pattern is found, the operator applies by an input device 25 a signal to a microprocessor 26 for controlling the image reading apparatus. In response to the signal indicating occurrence of the moire pattern, the microprocessor 26 executes a process for eliminating the moire pattern.

The moire pattern eliminating process comprises increasing the magnification of projection by the projection system 21 to N times the normal magnification, and causing the electrical reduction circuit 22 to reduce its input data to 1/N times the input. The data for determining the magnification N is stored in a memory 27, from which the data corresponding to one of a plurality of levels selected by the operator is read out.

Figure 3:
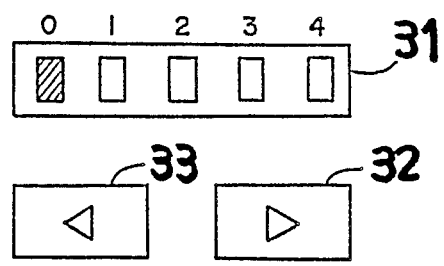
FIG. 3 is a diagram showing an operation panel for setting moire eliminating magnifications.

The moire pattern due to a difference in phase between the dot pitch and the reading pitch is eliminated by the optical enlargement. On the other hand, the moire pattern due to the periodic characteristics of dither processing is removed by the optical enlargement which eliminates a low-frequency component of the read data and by the electrical reduction which slightly alters the phase of read data. It is said that generally no moire pattern occurs when the reading density is about 8 times the dot density of the document. Accordingly, the optical enlargement is so effected as to realize such a relation between the dot density and reading density. Since the dot density varies from document to document, it is desirable that the magnification N be variable. FIG. 3 shows the arrangement on an operation panel for selecting magnification data. This diagram shows a magnification level indicator 31. The magnification level shown is changeable between level 0 to level 4 by an up key 32 or down key 33. Level 0 represents the normal magnification, which increases stepwise toward level 4.

Referring to FIG. 2 again, the input device 25 corresponds to the operation panel arrangement mentioned. In accordance with the level given by the input device 25, the microprocess 26 reads out magnification data N' from a memory 27. The microprocessor 26 calculates the magnification value N from the read-out magnification data N' and the current magnification value and delivers the value N to the projection system 21 while sending the magnification data N' to the electrical reduction circuit 22.

Figure 4:
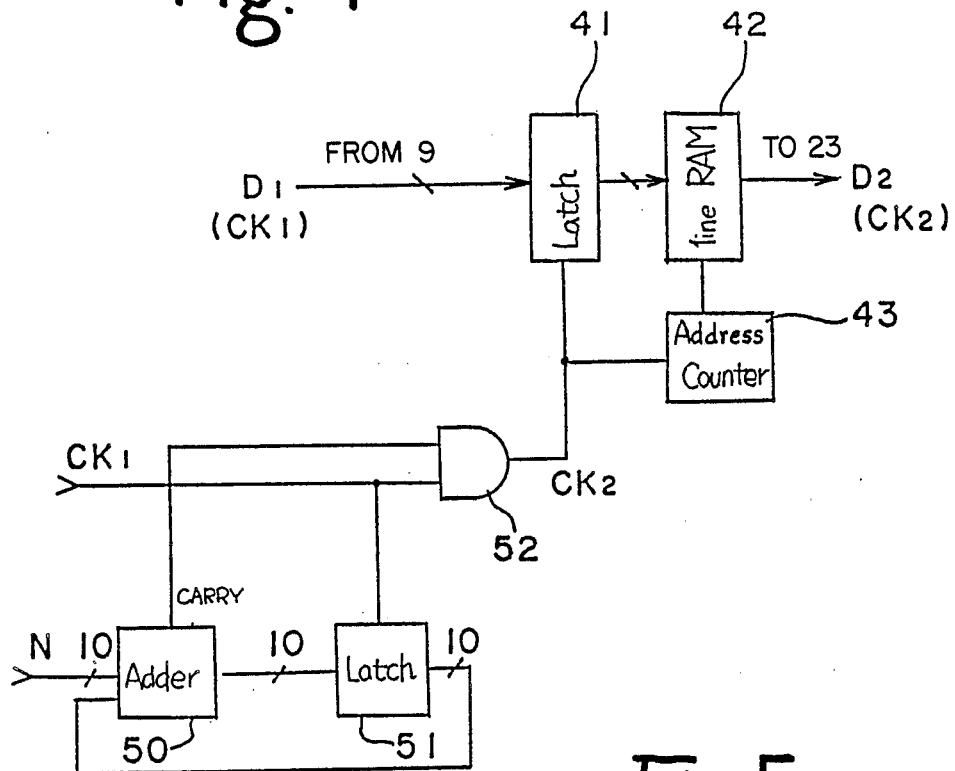
FIG. 4 is a diagram showing an exemplary electric reduction circuit.
Figure 5:
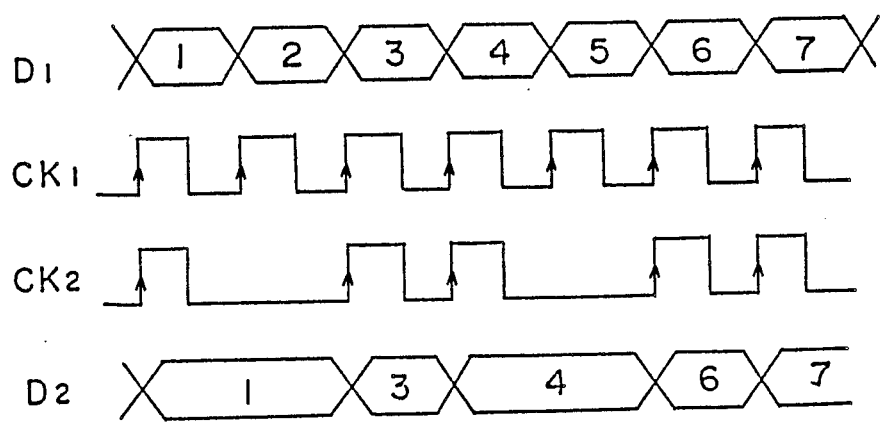
FIG. 5 is a time chart of the main input-output signals of the circuit of FIG. 4.

The circuit 22 thins out the data from the image sensor 9 according to the data N'. FIG. 4 shows an example of electrical reduction circuit, and FIG. 5 is a time chart showing the input and output signals thereof.

With reference to these drawings, data D1 from the image sensor 9 is given to a latch circuit 41 with the timing of clock pulses CK1 and delivered to a line RAM 42 having a storage capacity of one line, with timing given by clock pulses CK2. The clock pulses CK2 are also applied to an address counter 43 for addressing the line RAM 42. The pulse signal CK2 corresponds to the pulse signal CK1 as thinned out according to the data N'. According to the pulse signal CK2, the data D1 is thinned out to provide data D2 which is stored in the line RAM 42. The data D2 is sent to the next data processing circuit 23 for every line. Thus, the electrical reduction circuit 22 reduces the input data to 1/N (the reciprocal of the magnification value N) times the input.

The clock pulse signal CK2 is prepared by an adder 50, a latch circuit 51 and an AND circuit 52. The magnification data N' is applied to one of the input terminals of the adder 50, while an output signal from the latch circuit 51 is given to the other input terminal. The adder 50 delivers an output signal to the latch circuit 51, and the output timing of the latch circuit 51 is determined by the clock pulse signal CK1. The two input terminals of the AND circuit 52 individually receive the clock pulse signal CK1 and a carry signal from the adder 50. The AND output of the two signals provides the clock pulse signal CK2.

Assuming that the maximum value of the magnification data N' is 1024, 256, 512, 768 and 1024 are the magnification data N' of levels 1, 2, 3 and 4, respectively. According to the embodiment described, the data N' is sent 10-bit parallel, while 8-bit or 12-bit data is also usable.

While FIG. 3 shows four magnification selecting levels, the magnification data may be made settable as divided into an increased number of levels.

The time chart of FIG. 5 shows the relation between the clock pulse signals CK1, CK2, data D1 and data D2 when the magnification data N' is 683 and the adder 50 has a capacity of 1024.

According to the present invention described above, a moire pattern, if occurring, is effectively eliminated by reading the image at an enlarged projection magnification of N times and restoring the original data by electrically reducing the read data to 1/N times the reading scale.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus capable of eliminating moire patterns, comprising:
   an image sensor having a plurality of photoelectric elements aligned with each other for providing data of a document image;
   a projection means for projecting a document image onto the image sensor at a selected one of a normal magnification value and at a varied magnification value;
   means for processing the data of the document image provided by the image sensor;
   means for indicating an occurrence of a moire pattern;
   means, responding to the indicating means, for setting the projection means to project the document image onto the image sensor at the varied magnification value; and
   means, responding to the indicating means, for enabling the data processing means to electrically reduce the data of the document image by an amount corresponding to the varied magnification value.

2. An image reading apparatus as claimed in claim 1, wherein the varied magnification value is N times the normal magnification value and the data is reduced by 1/N by the data processing means.

3. An image reading apparatus as claimed in claim 1, wherein the projection means includes a projection lens which is movable in a direction of an optical axis thereof, the projection lens and the image sensor being located at positions corresponding to the magnification value at which the projection means projects the document image onto the image sensor such that the document image is focused on the image sensor.

4. An image reading apparatus as claimed in claim 1, wherein the data processing means comprises latch circuitry to which the data of the document image is input in accordance with first clock pulses and from which the data of the document image is output in accordance with second clock pulses, and circuitry which generates the second clock pulses and supplies them to the latch circuitry, the second clock pulses being generated by thinning out the first clock pusles.

5. In an image reader for reproducing indicia on a document, the improvement comprising:
   means for optically projecting an image of indicia of a document, the indicia being arranged on the document at a certain density;
   means for converting the optically-projected image into electrical signals;
   means for magnifying the optically-projected image prior to its conversion into electrical signals; and
   means for processing the electrical signals of the magnified optically-projected image to compensate for the magnification of the optically-projected image whereby spurious noise resulting from a difference between the density of the indicia and a reading density of the image reader is reduced.

6. The invention of claim 5 wherein the optically-projected image is magnified N times and the processing means reduces the electrical signals by a factor of 1/N.

7. The invention of claim 5 further including a printout device to provide a reproduction of the indicia on the document.

8. In an image reader for reproducing indicia on a document, the improvement comprising:
   means for optically projecting an image of indicia on a document, the indicia being arranged on the document at a certain density;
   means for converting the optically-projected image into electrical signals;
   means for selecting a magnification level;
   means for magnifying the optically-projected image prior to its conversion into electrical signals in response to the selected magnification level; and
   means for processing the electrical signals of the magnified optically-projected image to compensate for the magnification of the optically-projected image by reducing the electrical signals in proportion to the selected magnification level whereby spurious noise, such as a moire pattern, resulting from a difference between the density of the indicia and a reading density of the image reader is reduced.

9. The invention of claim 8 wherein the optically-projected image is magnified N times and the processing means reduces the electrical signals by a factor of 1/N.

10. The invention of claim 9 further including a printout device to provide a reproduction of the indicia on the document.

* * * * *